UNITED STATES PATENT OFFICE.

PEDER FARUP, OF CHRISTIANIA, NORWAY, ASSIGNOR TO TITAN CO. A/S, OF CHRISTIANIA, NORWAY.

WHITE PIGMENT.

1,360,737. Specification of Letters Patent. Patented Nov. 30, 1920.

No Drawing. Application filed March 10, 1919. Serial No. 281,735.

*To all whom it may concern:*

Be it known that I, PEDER FARUP, a subject of Norway, and a resident of Christiania, Norway, have invented certain new and useful Improvements in White Pigments, of which the following is a specification.

This invention relates to pigments the essential component of which is a titanium oxygen compound. The purpose of the invention is the production of an improved pigment of this class.

In United States Letters Patent 1,341,707, March 25, 1920, I have set forth a process for producing a white or light colored titanium oxygen material suitable for use as or in the manufacture of a pigment, that process being characterized by subjecting crude titanium hydrates to a suitable decomposition agent, and sintering the product at a comparatively low temperature with a suitable halogen compound. This invention aims at a modification in the said process whereby a product possessing a more brilliant whiteness is obtained.

The process herein set forth is broadly distinguishable from that of the said Letters Patent in that a phosphorus compound is employed and in that the temperature to which the material is heated in connection with the halogen compound has a wider range, embracing both sintering and smelting temperatures. It is optional whether the phosphorus compound be added in the form of phosphoric acid or a phosphate and whether with the decomposition agent or with the halogen compound. I prefer, however, to employ phosphoric acid and to make the addition to the decomposition agent.

In the following example of the invention a crude oxid or hydroxid of titanium, with small percentages of iron and sulfuric anhydrid present, is selected as the material to be treated; sulfuric acid as the decomposition agent; phosphoric acid as the phosphorus compound; and sodium chlorid as the material employed in connection with the sintering or smelting. It is to be understood, however, that the example is for illustrative purposes and that the invention is not intended to be limited thereto nor confined to the materials chosen.

The crude titanium oxygen compound is if necessary ground to a convenient form for treatment and placed in a suitable vat containing a mixture of the sulfuric acid and the phosphoric acid, the latter preferably being in such quantity that the final product will contain approximately 2.5 per cent. by weight $P_2O_5$.

After the contents of the vat have been thoroughly mixed and decomposition has taken place, the decomposition mass is ground with sodium chlorid preferably in the proportion of 1.4 parts sodium chlorid by weight to one part of the said mass. The ground material is then heated in any suitable furnace to the desired temperature, for example, to temperatures ranging about 300° to 700° C. During the heating the mass is periodically stirred and free hydrochloric acid is given off in the form of a gas. After reaction is complete, the mass, which is sintered or smelted depending upon the temperature employed, is allowed to cool, crushed if necessary, and lixiviated. The resulting residue is then dried and if desired reduced to powder.

From the filtrate remaining after the residue has been removed the sodium salts and whatever titanium remains can be recovered in any well known and suitable manner.

The washed residue, obtained as above, is in the form of small amorphous balls which are optically isotropic and even under a powerful microscope do not show a lack of homogeneity as to form or refraction of light. These observations lead to the conclusion that the product comprises a mutual colloidal solution in a solid state.

The composition of the product depends upon the materials used and the temperatures employed after leaching. With the materials above selected, the product when dried comprises a titanium oxygen compound consisting essentially of titanium oxid, together with phosphoric anhydrid, water of hydration, a small percentage of iron and possibly some sulfuric anhydrid. The product is whiter than the compounds obtained by the sintering process above referred to. It has a good oil carrying capacity and satisfactory hiding power.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of producing a material suitable for use as or in the manufacture of a pigment and comprising a substance containing titanium and phosphorus, which comprises subjecting a titanium oxygen compound to the action of a decomposing agent and a compound of phosphorus, heating the resultant product in the presence of a halogen compound to form a solid mass, and recovering the aforesaid pigment-material from the said mass, substantially as described.

2. The process of producing a material suitable for use as or in the manufacture of a pigment and comprising a substance containing titanium and phosphorus, which comprises subjecting a titanium oxygen compound to the action of a decomposing agent and phosphoric acid, heating the resultant product in the presence of a halogen compound to form a solid mass, and recovering the aforesaid pigment-material from the said mass.

3. The process of producing a material suitable for use as or in the manufacture of a pigment and comprising a substance containing titanium and phosphorus, which comprises subjecting a titanium oxygen compound to the action of sulfuric acid and phosphoric acid, heating the resultant product in the presence of a halogen compound to form a solid mass, and recovering the aforesaid pigment-material from the said mass.

4. The process of producing a material suitable for use as or in the manufacture of a pigment and comprising a substance containing titanium and phosphorus, which comprises subjecting a titanium oxygen compound to the action of sulfuric acid and phosphoric acid, heating the resultant product in the presence of sodium chlorid to form a solid mass, and recovering the aforesaid pigment-material from the said mass.

5. The process of producing a material suitable for use as or in the manufacture of a pigment and comprising a substance containing titanium and phosphorus, which comprises subjecting a titanium oxygen compound to the united action of a decomposing agent and a compound of phosphorus, heating the resultant product in the presence of a halogen compound to form a solid mass, and recovering the aforesaid pigment-material from the said mass.

6. The process of producing a material suitable for use as or in the manufacture of a pigment and comprising a substance containing titanium and phosphorus, which comprises subjecting a titanium oxygen compound to the united action of sulfuric acid and phosphoric acid, heating the resultant product in the presence of sodium chlorid to form a solid mass, and recovering the aforesaid pigment-material from the said mass.

7. The process of producing a material suitable for use as or in the manufacture of a pigment and comprising a substance containing titanium, iron, and phosphorus, which comprises subjecting a titanium oxygen compound with iron and sulfuric anhydrid present to the united action of sulfuric acid and phosphoric acid, heating the resultant product in the presence of sodium chlorid to form a solid mass, and recovering the aforesaid substance from the said mass.

8. In the manufacture of a pigment comprising a titanium oxygen compound and a small percentage of combined phosphorus, the process of intimately mixing a titanium hydrate with a relatively small amount of phosphoric acid.

9. As a new and useful article of manufacture, a material suitable for use as or in the manufacture of a pigment comprising a substance containing titanium and phosphorus formed by subjecting a titanium oxygen compound to the action of a decomposing agent and a compound of phosphorus, heating the resultant product in the presence of a halogen compound to form a solid mass, and lixiviating the said mass.

10. As a new and useful article of manufacture, a material suitable for use as or in the manufacture of a pigment, comprising a substance containing titanium and phosphorus formed by subjecting a titanium oxygen compound to the united action of sulfuric acid and phosphoric acid, heating the resultant product in the presence of sodium chlorid to form a solid mass, and lixiviating the said mass.

11. As a new and useful article of manufacture, a material suitable for use as or in the manufacture of a pigment, comprising a substance containing titanium, iron and phosphorus formed by subjecting a titanium oxygen compound containing iron to the united action of sulfuric acid and phosphoric acid, heating the resultant product in the presence of sodium chlorid to form a solid mass, and lixiviating the said mass.

12. As a new and improved article of manufacture, a white or light colored pigment containing an oxygen compound of titanium and combined phosphorus.

13. As a new and useful article of manufacture, a white or light colored pigment containing titanium, phosphorus and water of hydration.

Signed at Christiania, Norway, this 12th day of February, 1919.

PEDER FARUP.